(12) United States Patent
Swanson et al.

(10) Patent No.: US 11,493,655 B2
(45) Date of Patent: Nov. 8, 2022

(54) ADVANCED SEISMIC CONTROLLER SYSTEM

(71) Applicant: RH2 Engineering, Inc., Bothell, WA (US)

(72) Inventors: James Swanson, Bothell, WA (US); Lee Tumbleson, Bothell, WA (US); Ryan Mills, Bothell, WA (US); Isaac Oquist, Bothell, WA (US)

(73) Assignee: RH2 Engineering, Inc., Bothell, WA (US)

( * ) Notice: Subject to any disclaimer, the term of this patent is extended or adjusted under 35 U.S.C. 154(b) by 449 days.

(21) Appl. No.: 16/601,500

(22) Filed: Oct. 14, 2019

(65) Prior Publication Data

US 2020/0309977 A1    Oct. 1, 2020

Related U.S. Application Data

(60) Provisional application No. 62/823,480, filed on Mar. 25, 2019.

(51) Int. Cl.
*G01V 1/28*    (2006.01)
*G01V 1/30*    (2006.01)
*G01V 1/16*    (2006.01)

(52) U.S. Cl.
CPC .............. *G01V 1/288* (2013.01); *G01V 1/162* (2013.01); *G01V 1/307* (2013.01)

(58) Field of Classification Search
CPC ......... G01V 1/162; G01V 1/288; G01V 1/307
See application file for complete search history.

(56) References Cited

U.S. PATENT DOCUMENTS

| 10,535,995 B2 * | 1/2020 | Kawata | H02J 3/14 |
| 10,876,277 B1 * | 12/2020 | Fatehi | F16K 17/36 |
| 2021/0302609 A1 * | 9/2021 | Bardainne | G01V 1/303 |

* cited by examiner

*Primary Examiner* — Elias Desta
(74) *Attorney, Agent, or Firm* — PG Scott Born; FisherBroyles LLP

(57) ABSTRACT

A method includes receiving over a network from one or more seismic sensors a data set characterizing a seismic event generating a seismic wave. Based on the data set, a time of arrival and intensity of the seismic wave at a predetermined location is calculated. The predetermined location has one or more mitigation devices. Whether the intensity of the seismic wave exceeds a predetermined seismic intensity threshold is determined. If the intensity of the seismic wave exceeds the predetermined seismic intensity threshold, the one or more mitigation devices are activated.

15 Claims, 3 Drawing Sheets

| | |
|---|---|
| Buildings / Office / FM | Move elevator to nearest floor and open doors, sound alerts, close key facilities, alert people close to windows; start ER procedures |
| Hospitality | Shut off heat sources, secure/avoid dangerous areas (stoves, fryers), alert guests, open doors, trigger ER measures |
| Construction | Secure cranes, alert people in dangerous situations or unsafe locations |
| Comm & Data Networks | Alerts and re-routes, close networks, notify users |
| Transportation | |
| Commercial Trucking | Notify and re-route drivers |
| Airports | Stop take-offs and landings |
| Roads | Close bridges, halt freeway access, slow traffic |
| Rail - Commercial | Slow or stop trains |
| Rail - Amtrak | Slow or stop trains |
| Rail - Transit | Slow or stop trains |
| Sea Ports | Stop arrivals, departures |
| Schools | Alert staff, students, parents |
| Utilities | Start ER measures, alert protocols for personnel |
| Electric | Protect electrical equip; other ER measures |
| Gas | Close valves, prevent fires, other ER |
| Water Utilities | Close valves, stop pumps, warn personnel |
| Industrial | Close valves, stop pumps, slow or stop production, alert staff to move away from hazardous materials or unsafe locations |
| Medical | Pause surgeries & procedures, alert staff and patients, start generators |
| Emergency Reponders | Open firehouse garage doors, alert staff, notify first responders to take cover in aftershocks |
| Military | Secure troops, weapons, equip, facilities, transport |

FIG. 2

ADVANCED SEISMIC CONTROLLER SYSTEM

PRIORITY CLAIM

This application claims priority to U.S. Provisional Application No. 62/823,480 filed Mar. 25, 2019, the contents of which are hereby incorporated by reference as if fully set forth herein.

BACKGROUND 143 million Americans live in areas of significant seismic risk across 39 states, especially California and the U.S. Pacific Northwest (PNW). In the next 30 years, California has a 99.7% chance of a magnitude 6.7+ earthquake, and the PNW has a 10% chance of a potentially devastating magnitude 8 to 9 megathrust quake in the Cascadia Subduction Zone. Potential quakes in the Seattle, Tacoma, and South Whidbey Island Faults, for example, hold additional risk to approximately 4.3 million people.

FEMA estimates the average annualized loss from earthquakes to be $5.3 billion. However, depending on the type and location, the immediate, localized impact of any large seismic event may be much, much more. For example, the earthquake-caused economic cost just from water loss in Seattle, Tacoma, and Everett systems is estimated to be $1.4 billion (from a quake in the shallow Tacoma Fault) to $2.1 billion (Seattle Fault). Oregon estimates up to $32 billion in potential economic damage from a Cascadia quake.

BRIEF DESCRIPTION OF THE DRAWINGS

FIG. 2 is a table illustrating mitigations offered by various embodiments of the invention.

DETAILED DESCRIPTION

Figure 1:
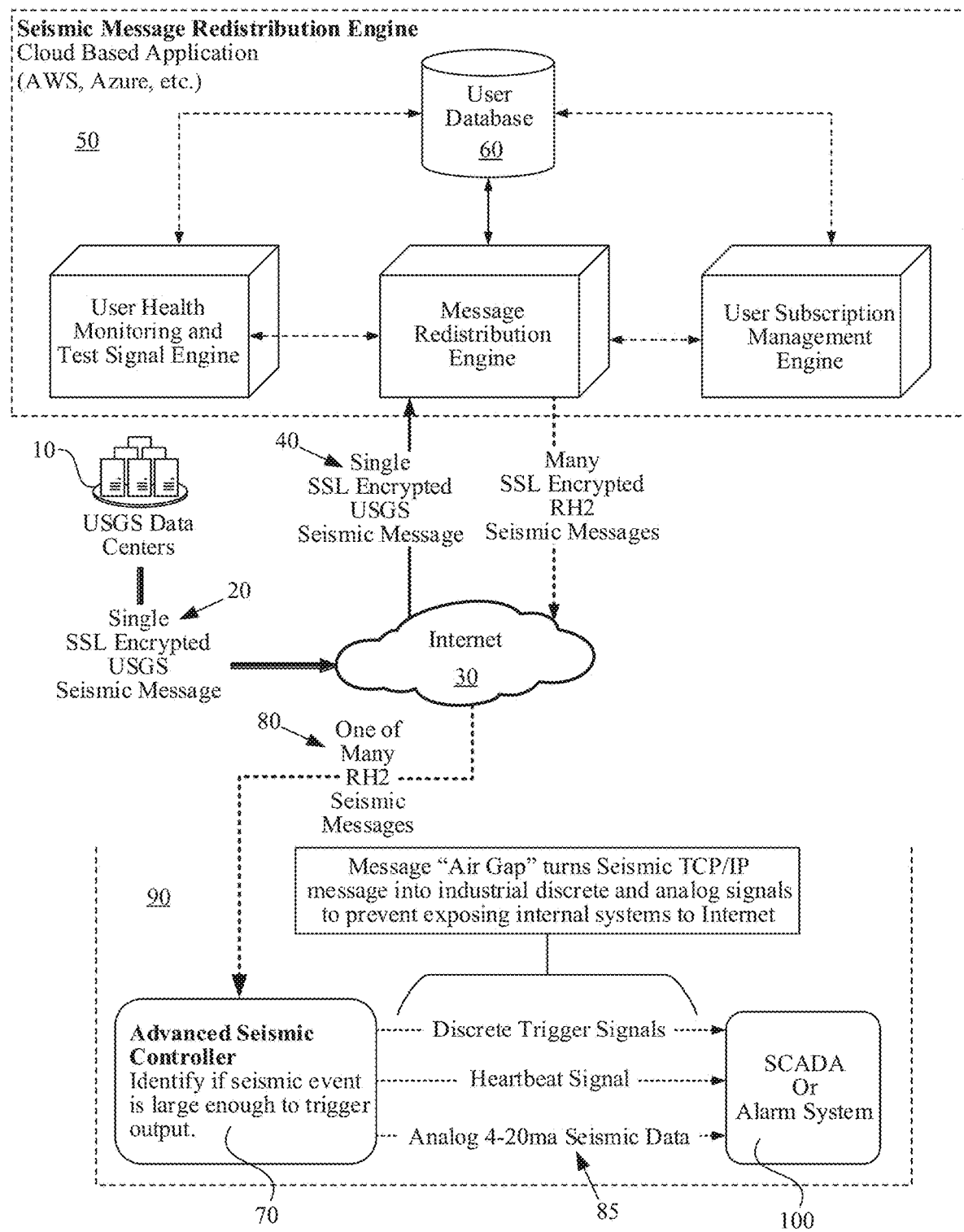
FIG. 1 illustrates a system according to one or more embodiments of the invention.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the present invention may comprise or utilize a special-purpose or general-purpose computer including computer hardware, such as, for example, one or more processors and system memory, as discussed in greater detail below. Embodiments within the scope of the present invention also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special-purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. In some embodiments, computer-executable instructions are executed on a general-purpose computer to turn the general-purpose computer into a special-purpose computer implementing elements of the invention. The computer executable instructions may be, for example, binaries, intermediate format instructions such as assembly language, or even source code.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment of the invention includes an advanced seismic controller (ASC) system developed as a process for automatically collecting United States Geological Survey (USGS) ShakeAlert messages and using them to trigger an advanced seismic event alarm for industrial Supervisory Control and Data Acquisition (SCADA)/Automation systems or for general purpose alarm systems. ShakeAlert is an experimental earthquake early warning system (EEW) for the West Coast of the United States and the Pacific Northwest sponsored by the USGS. Using hundreds of seismic sensors throughout the West Coast, this system can provide advance warning of a seismic event.

The ASC system includes a cloud-based software system for gathering the USGS seismic event messages from one or more USGS servers and redistributing these messages to advanced seismic controllers at a user's location. The system may include a subscription service that end users pay to access. The USGS currently does not have the infrastructure for thousands of connections to their servers. They have requested, after a connection threshold has been met, that outside vendors using their system act as proxy to end users for seismic messages.

Referring to FIG. 1, an embodiment of the system functions as follows:

Seismic sensors associated with USGS data centers 10 detect a seismic event and create a seismic network message 20. This message carries the origin location of the event and its magnitude.

The message is collected via a network, such as the Internet 30, over a Secure Socket Layer (SSL) connection 40 by the Seismic Message Redistribution Engine 50 that resides on a cloud platform such as Amazon Web Services or Microsoft Azure. According to an embodiment, this engine 50 has the following responsibilities:

Tracks subscribed users in a User Database 60. This database identifies users' account information such as billing information, communication health status, location of advanced seismic controllers 70, etc.

Monitors the health of users' advanced seismic controllers 70. If communications to a controller 70 are lost, the end user will be sent a message via SMS, email or other communication medium informing them of the situation.

Redistributes single USGS messages 80 using an SSL connection to all advanced seismic controllers 70 of user location systems 90.

In an embodiment, and more particularly, the USGS data centers 10 send out one or more data sets that may include source magnitude of the seismic event, location of the seismic event, time at which the seismic event occurred and probability of the accuracy of the message. One or more processors associated with advanced seismic controller 70 use this information to calculate time to arrival and intensity of a seismic wave at the user location 90 caused by the seismic event. An embodiment of the advanced seismic controller 70 calculates the distance from the event and creates a countdown based on time of arrival information from USGS; it passes seismic wave intensity, time of arrival, probability and distance through to the advanced seismic controller outputs 85. An embodiment allows a user to set predetermined setpoints on two discrete outputs to take action in the user's system or to control specific devices like water valves, warning systems, door locks, etc. An alternative embodiment of the advanced seismic controller 70 has only one discrete output.

More specifically, once the message 80 is collected by the advanced seismic controller 70 at a user location 90, the advanced seismic controller will identify the time before the event arrives and the intensity of the event. This information may be calculated using Java code distributed by the USGS for calculating characteristics of the travel of the seismic wave from the origin point of the seismic event to the user location 90.

The advanced seismic controller 70 has setpoints to trigger discrete relay outputs if the final intensity is over a certain predetermined threshold. In addition, 4-20 ma analog outputs can carry the seismic event intensity and time to arrival in seconds. These low-level signals are used instead of a TCP/IP connection in order to isolate mitigation devices 100 such as internal SCADA/Automation or Alarm systems from the Internet. This can be considered an "air gap" approach to maintain a secure separation from the Internet.

Once the message is received at the user location system 90, the advanced seismic controller 70 can trigger alarms and or shutdown systems in preparation for the seismic event. General purpose alarm systems may trigger alarm notifications that could be used for evacuating or preparing people for the seismic event. For example, in various embodiments and as illustrated in FIG. 2, many different mitigation devices and actions can be taken at the user location 90 depending on the types of structures and activities present at that location.

Figure 3:
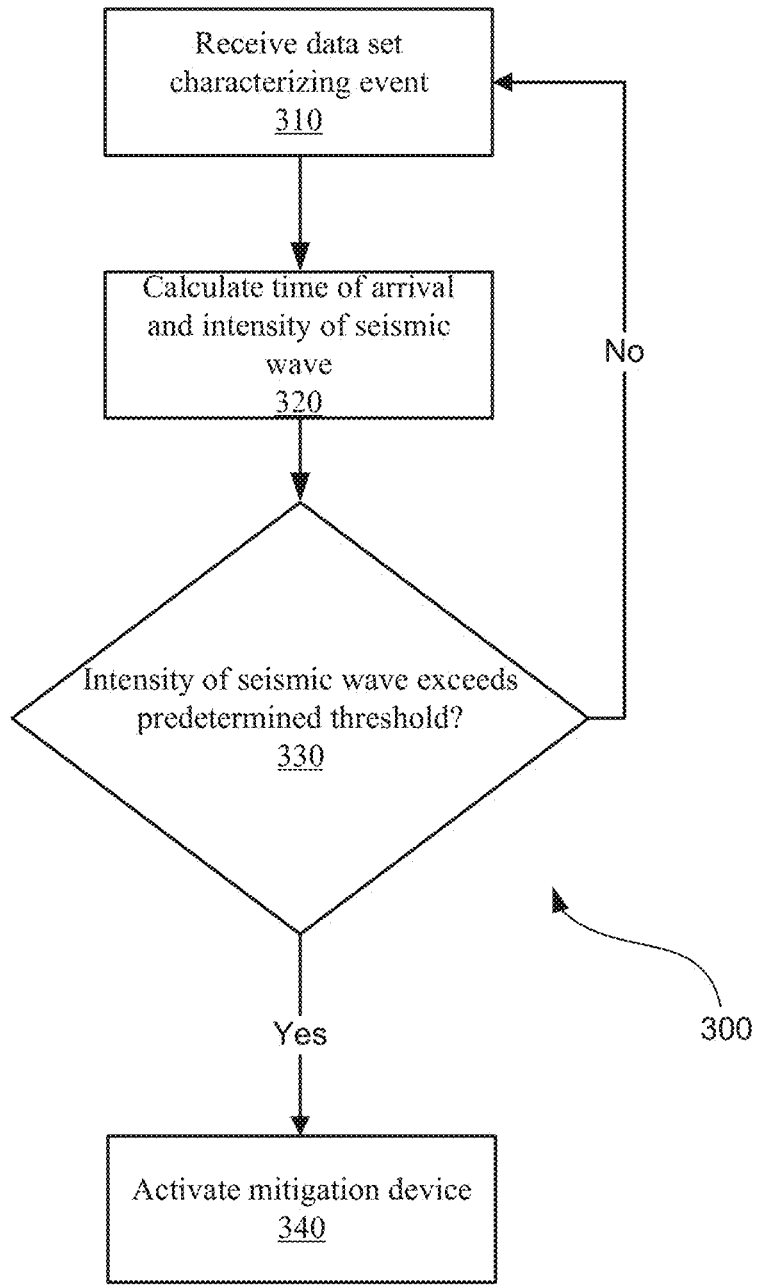
FIG. 3 is a flowchart illustrating a process according to an embodiment of the invention.

FIG. 3 illustrates a process 300 for storing data according to an embodiment of the invention. The process 300 is implementable in an electronic system coupled to or including a storage device. The process 300 is illustrated as a set of operations shown as discrete blocks. The process 300 may be implemented in any suitable hardware, software, firmware, or combination thereof. The order in which the operations are described is not to be necessarily construed as a limitation.

At a block 310, a data set characterizing a seismic event generating a seismic wave is received over a network from one or more seismic sensors.

At a block 320, a time of arrival and intensity of the seismic wave at a predetermined location is calculated based on the data set. The predetermined location has one or more mitigation devices as are discussed above herein.

At a block 330, whether the intensity of the seismic wave exceeds a predetermined seismic intensity threshold is determined. If the intensity of the seismic wave does not exceed the predetermined seismic intensity threshold, the process 300 returns to block 310.

At a block 340, if the intensity of the seismic wave exceeds the predetermined seismic intensity threshold, the one or more mitigation devices are activated.

While the preferred embodiment of the disclosure has been illustrated and described, as noted above, many changes can be made without departing from the spirit and scope of the disclosure. Accordingly, the scope of the described systems and techniques is not limited by the disclosure of the preferred embodiment. Instead, the described systems and techniques should be determined entirely by reference to the claims.

What is claimed is:

1. At least one computer-readable medium on which are stored instructions that, when executed by at least one processing device, enable the at least one processing device to perform a method comprising the steps of:
   receiving over a network from one or more seismic sensors a data set characterizing a seismic event generating a seismic wave;
   based on the data set, calculating a time of arrival and intensity of the seismic wave at a predetermined location, the predetermined location having one or more mitigation devices;
   determining if the intensity of the seismic wave exceeds a predetermined seismic intensity threshold; and
   if the intensity of the seismic wave exceeds the predetermined seismic intensity threshold, activating the one or more mitigation devices.

2. The medium of claim 1, wherein the data set comprises magnitude of the seismic event.

3. The medium of claim 1, wherein the data set comprises the time at which the seismic event occurred.

4. The medium of claim 1, wherein the one or more mitigation devices are activated by one or more analog output signals generated by the at least one processing device.

5. The medium of claim 1, wherein the one or more mitigation devices comprise an alarm.

6. A method, comprising the steps of
   receiving over a network from one or more seismic sensors a data set characterizing a seismic event generating a seismic wave;
   based on the data set, calculating a time of arrival and intensity of the seismic wave at a predetermined location, the predetermined location having one or more mitigation devices;
   determining if the intensity of the seismic wave exceeds a predetermined seismic intensity threshold; and
   if the intensity of the seismic wave exceeds the predetermined seismic intensity threshold, activating the one or more mitigation devices.

7. The method of claim 6, wherein the data set comprises magnitude of the seismic event.

8. The method of claim 6, wherein the data set comprises the time at which the seismic event occurred.

9. The method of claim 6, wherein the one or more mitigation devices are activated by one or more analog output signals generated by the at least one processing device.

10. The medium of claim 6, wherein the one or more mitigation devices comprise an alarm.

11. A system, comprising:
    one or more input devices coupled to a network and configured to receive over the network from one or more seismic sensors a data set characterizing a seismic event generating a seismic wave;
    at least one processing device configured to calculate, based on the data set, a time of arrival and intensity of the seismic wave at a predetermined location, the predetermined location having one or more mitigation devices, the at least one processing device further configured to determine if the intensity of the seismic wave exceeds a predetermined seismic intensity threshold; and
    one or more output devices configured to activate the one or more mitigation devices if the intensity of the seismic wave exceeds the predetermined seismic intensity threshold.

12. The system of claim 11, wherein the data set comprises magnitude of the seismic event.

13. The system of claim 11, wherein the data set comprises the time at which the seismic event occurred.

14. The system of claim 11, wherein the one or more mitigation devices are activated by one or more analog output signals generated by the at least one processing device.

15. The system of claim 11, wherein the one or more mitigation devices comprise an alarm.

* * * * *